United States Patent
Matsui et al.

(10) Patent No.: US 6,868,409 B2
(45) Date of Patent: Mar. 15, 2005

(54) METHOD OF AND COMPUTER PROGRAM FOR SEARCHING INFORMATION

(75) Inventors: Noriyuki Matsui, Kawasaki (JP); Masashi Asakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 09/927,644

(22) Filed: Aug. 13, 2001

(65) Prior Publication Data

US 2003/0004910 A1 Jan. 2, 2003

(30) Foreign Application Priority Data

Feb. 26, 2001 (JP) ........................................ 2001-051102

(51) Int. Cl.⁷ ........................ G06F 17/00; G06F 17/20
(52) U.S. Cl. ............................ 706/11; 706/50; 706/12
(58) Field of Search ................................ 706/11, 50, 12

(56) References Cited

U.S. PATENT DOCUMENTS

| | | |
|---|---|---|
| 5,761,389 A | 6/1998 | Maeda et al. ............... 706/59 |
| 5,940,815 A | 8/1999 | Maeda et al. ............... 706/12 |
| 6,483,938 B1 * | 11/2002 | Hennessey et al. ......... 382/149 |

FOREIGN PATENT DOCUMENTS

| | | |
|---|---|---|
| JP | HEI 1-270142 A | 10/1989 |
| JP | HEI 5-20407 A | 1/1993 |
| JP | HEI 8-30458 A | 2/1996 |
| JP | HEI 8-77010 A | 3/1996 |
| JP | HEI 9-259165 A | 10/1997 |
| JP | HEI 10-11481 A | 1/1998 |

* cited by examiner

*Primary Examiner*—Anthony Knight
*Assistant Examiner*—Joseph P. Hirl
(74) *Attorney, Agent, or Firm*—Staas & Halsey LLP

(57) ABSTRACT

Includes the information search database as a knowledge database storing a plurality of causes, a plurality of questions having the cause-and-effect relation with the plurality of causes, and correlation levels showing a degree of the correlations between the causes and corresponding questions. The search control unit extracts certain questions out of the plurality of questions by the algorithm based on the correlation levels and extracting causes with high correlation levels out of the plurality of causes based on the searcher's answer result to each of the certain questions from the information database, and then presenting the causes thus extracted as the search result.

13 Claims, 12 Drawing Sheets

| CAUSE CODE \ QUESTION CODE | 1 | 2 | 3 | 4 | 5 | 6 | 7 | 8 | 9 | 10 |
|---|---|---|---|---|---|---|---|---|---|---|
| A | 1 | 0 | 4 | 2 | −1 | 0 | 0 | 0 | 0 | 0 |
| B | 1 | 1 | 0 | 2 | −1 | 0 | 1 | 0 | 2 | 0 |
| C | 1 | −1 | 2 | 2 | 1 | 0 | 0 | 0 | 1 | 1 |
| D | 1 | 1 | 0 | 1 | 0 | 4 | 0 | 2 | 1 | 0 |
| E | 0 | 1 | 0 | 0 | −1 | 1 | 4 | 2 | 1 | 0 |
| F | 1 | 1 | 0 | 0 | −1 | 2 | 2 | 4 | 2 | 0 |
| G | 1 | 1 | 0 | 0 | −1 | 2 | 1 | 2 | 1 | 1 |
| H | 0 | 1 | 1 | 4 | −1 | 0 | 0 | 1 | 2 | 1 |
| I | 1 | 0 | 0 | 1 | −1 | 4 | 2 | 1 | 0 | 0 |
| J | 0 | 0 | 1 | 1 | 0 | 1 | 2 | 4 | 2 | 1 |

| QUESTION CODE | QUESTION |
|---|---|
| 1 | IS DEFICIENCY CAUSED AT HIGH TEMPERATURE? |
| 2 | IS DEFICIENCY CAUSED AT LOW TEMPERATURE? |
| 3 | IS PULSE WIDTH OUT OF SPECIFICATIONS? |
| 4 | IS DEFICIENCY CAUSED AT HIGH VOLTAGE? |
| 5 | IS DEFICIENCY CAUSED AT LOW VOLTAGE? |
| 6 | IS DEFICIENCY CAUSED AT STANDARD VOLTAGE? |
| 7 | IS INTERMITTENT FAILURE OCCURRING? |
| 8 | IS CLOCK SIGNAL DISTORTED? |
| 9 | IS THERE ANY NOISE IN OUTPUT DATA? |
| 10 | IS THERE ANY NOISE AT POWER SOURCE? |

FIG.4

| CAUSE CODE | CAUSE |
|---|---|
| A | POOR CONTACT AT BONDING WIRE |
| B | ERROR IN TUNNEL OXIDE FILM |
| C | HIGH IMPEDANCE |
| D | HIGH VOLTAGE OUT OF SPECIFICATION |
| E | LOW VOLTAGE OUT OF SPECIFICATION |
| F | NORMAL VOLTAGE OUT OF SPECIFICATION |
| G | SHORTAGE OF CAPACITANCE OF CAPACITOR |
| H | CHARGE LOSS |
| I | POOR CONTACT AT SOCKET |
| J | SHORTAGE OF NOISE MARGIN AT POWER SOURCE |

FIG.5

| ANSWER | WEIGHT (ANSWER VALUE) |
|---|---|
| YES | 1 |
| NO | −1 |
| UNKNOWN | 0 |

FIG.6

| JUDGED VALUE | DISPLAY COLOR |
|---|---|
| 5 OR LESS | BLUE |
| 6 OR 7 | YELLOW |
| 8 OR GREATER | RED |

| | | QUESTION CODE | | | | | | | | | |
|---|---|---|---|---|---|---|---|---|---|---|---|
| | | 1 | 2 | 3 | 4 | 5 | 6 | 7 | 8 | 9 | 10 |
| CAUSE CODE | A | 1 | 0 | 4 | 2 | −1 | 0 | 0 | 0 | 0 | 0 |
| | B | 1 | 1 | 0 | 2 | −1 | 0 | 1 | 0 | 2 | 0 |
| | C | 1 | −1 | 2 | 2 | 1 | 0 | 0 | 0 | 1 | 1 |
| | D | 1 | 1 | 0 | 1 | −1 | 4 | 0 | 2 | 1 | 0 |
| | E | 0 | 1 | 0 | 0 | 0 | 1 | 4 | 2 | 1 | 0 |
| | F | 1 | 1 | 0 | 0 | −1 | 2 | 2 | 4 | 2 | 0 |
| | G | 1 | 1 | 0 | 0 | −1 | 2 | 1 | 2 | 1 | 1 |
| | H | 0 | 1 | 1 | 4 | −1 | 0 | 0 | 1 | 2 | 1 |
| | I | 1 | 0 | 0 | 1 | −1 | 4 | 2 | 1 | 0 | 0 |
| | J | 0 | 0 | 1 | 1 | 0 | 1 | 2 | 4 | 2 | 1 |
| FIRST ANSWER VALUE | | 1 | 1 | | | −1 | | | | | 0 |

FIG.8

|  | | \_350 QUESTION CODE | | | | | | | | | |
|---|---|---|---|---|---|---|---|---|---|---|---|
|  | | 1 | 2 | 3 | 4 | 5 | 6 | 7 | 8 | 9 | 10 |
| CAUSE CODE | A | 1 | 0 | 4 | 2 | −1 | 0 | 0 | 0 | 0 | 0 |
|  | B | 1 | 1 | 0 | 2 | −1 | 0 | 1 | 0 | 2 | 0 |
|  | C | 1 | −1 | 2 | 2 | 1 | 0 | 0 | 0 | 1 | 1 |
|  | D | 1 | 1 | 0 | 1 | −1 | 4 | 0 | 2 | 1 | 0 |
|  | E | 0 | 1 | 0 | 0 | 0 | 1 | 4 | 2 | 1 | 0 |
|  | F | 1 | 1 | 0 | 0 | −1 | 2 | 2 | 4 | 2 | 0 |
|  | G | 1 | 1 | 0 | 0 | −1 | 2 | 1 | 2 | 1 | 1 |
|  | H | 0 | 1 | 1 | 4 | −1 | 0 | 0 | 1 | 2 | 1 |
|  | I | 1 | 0 | 0 | 1 | −1 | 4 | 2 | 1 | 0 | 0 |
|  | J | 0 | 0 | 1 | 1 | 0 | 1 | 2 | 4 | 2 | 1 |
| FIRST ANSWER VALUE | | 1 | 1 |  |  | −1 |  |  |  |  | 0 |

FIG.9

| 350 | | \multicolumn{10}{c}{QUESTION CODE} |
|---|---|---|---|---|---|---|---|---|---|---|---|
| | | 1 | 2 | 3 | 4 | 5 | 6 | 7 | 8 | 9 | 10 |
| CAUSE CODE | A | 1 | 0 | 4 | 2 | −1 | 0 | 0 | 0 | 0 | 0 |
| | B | 1 | 1 | 0 | 2 | −1 | 0 | 1 | 0 | 2 | 0 |
| | C | 1 | −1 | 2 | 2 | 1 | 0 | 0 | 0 | 1 | 1 |
| | D | 1 | 1 | 0 | 1 | −1 | 4 | 0 | 2 | 1 | 0 |
| | E | 0 | 1 | 0 | 0 | 0 | 1 | 4 | 2 | 1 | 0 |
| | F | 1 | 1 | 0 | 0 | −1 | 2 | 2 | 4 | 2 | 0 |
| | G | 1 | 1 | 0 | 0 | −1 | 2 | 1 | 2 | 1 | 1 |
| | H | 0 | 1 | 1 | 4 | −1 | 0 | 0 | 1 | 2 | 1 |
| | I | 1 | 0 | 0 | 1 | −1 | 4 | 2 | 1 | 0 | 0 |
| | J | 0 | 0 | 1 | 1 | 0 | 1 | 2 | 4 | 2 | 1 |
| FIRST ANSWER VALUE | | 1 | 1 | | | −1 | | | | | 0 |
| SECOND ANSWER VALUE | | | | | 0 | | 1 | −1 | 1 | 1 | |

FIG.10

| 350 | | 1 | 2 | 3 | 4 | 5 | 6 | 7 | 8 | 9 | 10 | JUDGED VALUE |
|---|---|---|---|---|---|---|---|---|---|---|---|---|
| | | \multicolumn{10}{c|}{QUESTION CODE} | |

| | | 1 | 2 | 3 | 4 | 5 | 6 | 7 | 8 | 9 | 10 | JUDGED VALUE |
|---|---|---|---|---|---|---|---|---|---|---|---|---|
| CAUSE CODE | A | 1 | 0 | 4 | 2 | −1 | 0 | 0 | 0 | 0 | 0 | |
| | B | 1 | 1 | 0 | 2 | −1 | 0 | 1 | 0 | 2 | 0 | 4 |
| | C | 1 | −1 | 2 | 2 | 1 | 0 | 0 | 0 | 1 | 1 | |
| | D | 1 | 1 | 0 | 1 | −1 | 4 | 0 | 2 | 1 | 0 | 10 |
| | E | 0 | 1 | 0 | 0 | 0 | 1 | 4 | 2 | 1 | 0 | |
| | F | 1 | 1 | 0 | 0 | −1 | 2 | 2 | 4 | 2 | 0 | 9 |
| | G | 1 | 1 | 0 | 0 | −1 | 2 | 1 | 2 | 1 | 1 | 7 |
| | H | 0 | 1 | 1 | 4 | −1 | 0 | 0 | 1 | 2 | 1 | |
| | I | 1 | 0 | 0 | 1 | −1 | 4 | 2 | 1 | 0 | 0 | |
| | J | 0 | 0 | 1 | 1 | 0 | 1 | 2 | 4 | 2 | 1 | |
| FIRST ANSWER VALUE | | 1 | 1 | | | −1 | | | | | 0 | |
| SECOND ANSWER VALUE | | | | | 0 | | 1 | −1 | 1 | 1 | | |

FIG.12

```
                   410
┌──────────────────────────────────────────────────────────────┐
│                                                              │
│      IN ORDER TO NARROW CAUSES OF MEMORY TROUBLE, CHOOSE     │
│      ONE OF THREE ALTERNATIVES FOR EACH OF THE FOLLOWING     │
│                          QUESTIONS                           │
│                                                              │
└──────────────────────────────────────────────────────────────┘
```

| QUESTIONS | YES | NO | UNKNOWN |
|---|---|---|---|
| 1. IS DEFICIENCY CAUSED AT HIGH TEMPERATURE? | ☑ | ☐ | ☐ |
| 2. IS DEFICIENCY CAUSED AT LOW TEMPERATURE? | ☑ | ☐ | ☐ |
| 5. IS DEFICIENCY CAUSED AT LOW VOLTAGE? | ☐ | ☑ | ☐ |
| 10. IS THERE ANY NOISE AT POWER SOURCE? | ☐ | ☐ | ☑ |

AFTER MARKING THE CORRESPONDING BOXES, PLEASE DEPRESS THE ANSWER BUTTON

411 — | ANSWER |

IN ORDER TO NARROW CAUSES OF MEMORY
TROUBLE, CHOOSE ONE OF THREE ALTERNATIVES
FOR EACH OF THE FOLLOWING QUESTIONS

| QUESTIONS | YES | NO | UNKNOWN |
|---|---|---|---|
| 4. IS DEFICIENCY CAUSED AT HIGH VOLTAGE? | ☐ | ☐ | ☑ |
| 6. IS DEFICIENCY CAUSED AT STANDARD VOLTAGE? | ☑ | ☐ | ☐ |
| 7. IS INTERMITTENT ERROR OCCURRING? | ☐ | ☑ | ☐ |
| 8. IS CLOCK SIGNAL DISTORTED? | ☑ | ☐ | ☐ |
| 9. IS THERE ANY NOISE IN OUTPUT DATA? | ☑ | ☐ | ☐ |

AFTER MARKING THE CORRESPONDING BOXES, PLEASE
DEPRESS THE ANSWER BUTTON

421 — ANSWER

FOLLOWINGS ARE PROBABLE CAUSES OF MEMORY TROUBLE
PLEASE TAKE ADEQUATE ACTION

| CAUSE CODE | CAUSE | JUDGED VALUE | |
|---|---|---|---|
| D | HIGH VOLTAGE OUT OF SPECS | 10 | (DISPLAYED IN RED) |
| F | NORMAL VOLTAGE OUT OF SPECS | 9 | (DISPLAYED IN RED) |
| G | ERROR IN TUNNEL OXIDE FILM | 7 | (DISPLAYED IN YELLOW) |
| B | SHORTAGE OF CAPACITOR | 4 | (DISPLAYED IN BLUE) |

FIG.16

| SYMPTONS / CAUSE | SYMPTON 1 | SYMPTON 2 | SYMPTON 3 | | ... |
|---|---|---|---|---|---|
| CAUSE A (SHORTAGE OF CAPACITOR) | DEFICIENCY AT HIGH VOLTAGE | DEFICIENCY AT LOW VOLTAGE | DEFICIENCY AT HIGH TEMPERATURE | | ... |
| CAUSE B (MEMORY CELL LEAKAGE) | DEFICIENCY AT HIGH VOLTAGE | DEFICIENCY AT LOW VOLTAGE | DEFICIENCY AT HIGH TEMPERATURE | | ... |
| CAUSE C (CROSS TALK) | DEFICIENCY AT HIGH VOLTAGE | DEFICIENCY AT LOW VOLTAGE | NOISE AT POWER SOURCE | | ... |

# METHOD OF AND COMPUTER PROGRAM FOR SEARCHING INFORMATION

FIELD OF THE INVENTION

The present invention relates to a method of and computer program for searching desired information out of a huge volume of information. More particularly, this invention relates to method of and computer program for searching information that is capable of enhancing a matching accuracy by means of fuzzy matching.

BACKGROUND OF THE INVENTION

With the recent rapid development of the information technology, a volume of information handled both in business world and private life has been increasing sharply. Also, a search technology to search desired information out of a huge volume of information more efficiently is deemed as an important factor in the information technology, and for this reason, corporations, institutions, etc. have been conducting a study of the search technology actively.

An information search apparatus, which has stored a huge volume of information in a database and conducts a search through the database with a search key to output a hit list (search result), has been used in various fields. Examples of the information search apparatus of this kind include: the one that presumes a cause (search result) from a symptom of machine trouble (search key), the one that presumes the name of a disease or a cure (search result) from symptoms (search key), etc. These information search apparatuses make highly intellectual judgments, and conduct fuzzy matching by using a database referred to as a knowledge database.

FIG. 16 is a view showing an example of an information search database 10 employed in a conventional information search apparatus. The information search database 10 is a type of the aforementioned knowledge database, and used in presuming a cause from a symptom of machine trouble. The information search database 10 is given with a definition of a cause-and-effect relation between "symptom" and "cause" related to the machine trouble.

More specifically, a plurality of concrete symptoms, such as "symptom 1", "symptom 2", "symptom 3", . . . are described in the lateral direction, and "cause A", "cause B", and "cause C" corresponding to "symptom 1", "symptom 2", "symptom 3", . . . are described in the longitudinal direction.

Precisely, the drawing shows that "symptom 1" (deficiency at high voltage), "symptom 2" (deficiency at low voltage), "symptom 3" (deficiency at high temperature), . . . in the first record are closely related to "cause A" (shortage of capacitor) in the cause-and-effect relation. Also, the drawing shows that "symptom 1" (deficiency at high voltage), "symptom 2" (deficiency at low voltage), "symptom 3" (deficiency at high temperature), . . . in the second record are closely related to "cause B" (memory cell leakage) in the cause-and-effect relation. Further, the drawing shows that "symptom 1" (deficiency at high voltage), "symptom 2" (deficiency at low voltage), "symptom 3" (noise at power source) . . . in the third record are closely related to "cause C" (cross talk) in the cause-and-effect relation.

With the conventional information search apparatus, if "deficiency at high voltage" and "noise at power source" are given as the symptoms, then the search result shows "cause C" alone as a probable cause. This indicates that a matching accuracy is high, in other words, the search result is narrowed. Hence, the searcher can take a prompt action for the machine trouble based on a single cause, "cause C".

On the contrarily, if "deficiency at high voltage" and "deficiency at low voltage" are given as the symptoms, then the search result shows all of "cause A" through "cause C" as probable causes. This indicates the matching accuracy is low, in other words, the search result is not narrowed. Hence, the searcher has to take actions for the machine trouble based on all the three causes, "cause A" through "cause C", and then narrow the three causes to one.

Incidentally, as has been discussed, with the conventional information search apparatus that conducts the fuzzy matching, when a single symptom corresponds to more than one cause for the structural reason of the information search database 10, more than one cause is outputted as the search result, which poses a problem that the matching accuracy is poor.

This problem becomes more apparent with an increasing volume of information stored in the information search database 10, and could result in a fatal problem that the apparatus can no longer function as a search apparatus when given with certain search criteria because of too many matching causes.

SUMMARY OF THE INVENTION

It is an object of this invention to provide an information search program and an information search method capable of improving a matching accuracy of the fuzzy matching using a knowledge database.

According to the present invention, a knowledge database which stores a plurality of causes, a plurality of questions having a cause-and-effect relation with the plurality of causes, and correlation levels showing a degree of correlations between the causes and corresponding questions. Certain questions out of the plurality of questions in the database are extracted by an algorithm based on the correlation levels. Moreover, causes with high correlation levels are extracted out of the plurality of causes based on an answer result of each of the certain questions from a searcher.

Other objects and features of this invention will become apparent from the following description with reference to the accompanying drawings.

BRIEF DESCRIPTION OF THE DRAWINGS

FIG. 2 is a view showing an example of an information search database 350 shown in FIG. 1;

FIG. 3 is a view showing an example of a question table 360 shown in FIG. 1;

FIG. 4 is a view showing an example of a cause table 370 shown in FIG. 1;

FIG. 5 is a view showing an example of an answer weighting table 380 shown in FIG. 1;

FIG. 6 is a view showing an example of a display color table 390 shown in FIG. 1;

FIG. 7 is a view showing an example of an updated information search database 350 shown in FIG. 1;

FIG. 8 is a view explaining a second question extracting algorithm in the above embodiment;

FIG. 9 is a view showing an example of an updated information search database 350 shown in FIG. 1;

FIG. 10 is a view showing an example of an updated information search database 350 shown in FIG. 1;

FIG. 12 is a view showing an example of a first question/answer screen 410 in the above embodiment;

FIG. 13 is a view showing an example of a second question/answer screen 420 in the above embodiment;

FIG. 16 is a view showing an example of an information search database 10n employed in a conventional information search apparatus.

DESCRIPTION OF THE PREFERRED EMBODIMENTS

One embodiment of the method of and computer program for searching information the present invention will be explained below with reference to the accompanying drawings.

Figure 1:
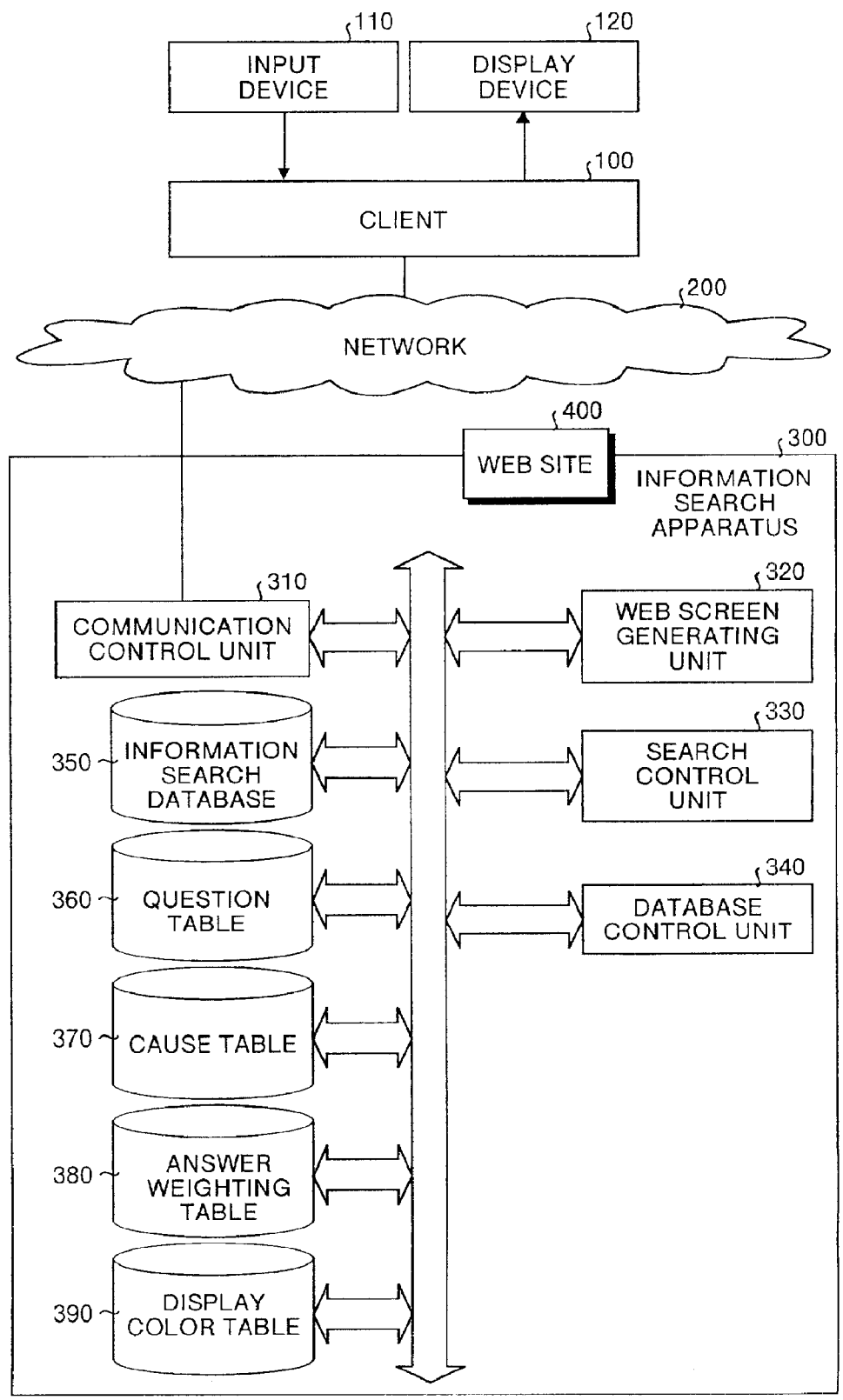
FIG. 1 is a block diagram showing an arrangement in one embodiment of the present invention.

FIG. 1 is a block diagram showing an arrangement in one embodiment of the present invention. The drawing shows a system for conducting fuzzy matching by using the aforementioned knowledge database. In the drawing, communication devices (terminal adapter, router, firewall, etc.) necessary for a link to the network are omitted for ease of explanation.

In the drawing, a client 100 denotes a computer main body installed at the searcher's end, and the searcher operates the same when he conducts the fuzzy matching. The client 100 is allowed to access an information search apparatus 300 through a network 200 in accordance with a predetermined protocol (for example, TCP/IP (Transmission Control Protocol/Internet Protocol). Also, the client 100 is provided with a Web browser to allow the searcher to review each Web screen on a Web site 400 described below.

An input device 110 is connected to the client 100, and composed of a keyboard, a mouse, etc. for use in inputting search criteria, etc. A display device 120 is connected to the client 100 and displays each Web screen (see FIGS. 12 through 14) on the Web site 400 described below. The network 200 is an internet, local area network, etc.

The information search apparatus 300 is a server provided with a function to accept access as to a search request from the client 100, a function to provide the Web site 400 to the client 100, a function to output a hit list (search result), etc. The Web site 400 is a site for use in providing the searcher with an interactive fuzzy matching function.

In the information search apparatus 300, a communication control unit 310 controls a communication between the information search apparatus 300 and client 100 through the network 200 in accordance with the TCP/IP, for example. A Web screen generating unit 320 automatically generates Web screens respectively shown in FIGS. 12 through 14. A detailed description of these Web screens will be given below. A search control unit 330 conducts the fuzzy matching by narrowing the search result by way of several steps through the interaction with the searcher based on an information search database 350, a question table 360, a cause table 370, an answer weighting table 380, and a display color table 390, and outputting the narrowed search result. The operation of the search control unit 330 will de detailed below.

A database control unit 340 controls an access to the information search database 350, question table 360, cause table 370, answer weighting table 380, and display color table 390, and updates the information search database 350, etc. Here, the following description will describe in detail, with reference to FIGS. 2 through 6, the information search database 350, question table 360, cause table 370, answer weighting table 380, and display color table 390.

The information search database 350 shown in FIG. 2 is one type of the knowledge database, and used in presuming a cause (search result) from a symptom (search key) of machine trouble. Herein, the following description will describe a memory trouble as an example of the machine trouble in one embodiment. The information search database 350 is provided with two-dimensional arrays of "question codes" 1 through 10 each representing different "question" to allow the searcher to select the symptom related to the memory trouble, and "cause codes" A through J each representing different "cause" corresponding to the symptom.

The correspondence between "question codes" and "questions", and that between "cause codes" and "cause S" shown in FIG. 2 are defined in the question table 360 (see FIG. 3) and cause table 370 (see FIG. 4), respectively. The question table 360 shown in FIG. 3 is a table that defines the correspondence between "question codes" and "questions". As can be understood from the drawing, "question code"=1 shown in FIG. 2 corresponds to "question"="Is deficiency caused at high temperature?". Likewise, "question code"=10 shown in FIG. 2 corresponds to "question"="Is there any noise at power source?".

The cause table 370 shown in FIG. 4 is a table that defines the correspondence between "cause codes" and "causes". As can be understood from the drawing, "cause code"=A shown in FIG. 2 corresponds to "cause"="Poor contact at bonding wire". Likewise, "cause code"=J shown in FIG. 2 corresponds to "cause"="insufficient noise margin at power source".

Also, the information search database 350 is provided with, for convenience of explanation, 6 correlation levels (−1 to 4) each quantitatively representing the correlation between "question" and "cause" at each cross point between the "question codes" and "cause codes". In case of the correlation level=−1, the correlation between "question" and "cause" is the remotest. On the other hand, in case of the correlation level=4, the correlation between "question" and "cause" is the closest. These correlation levels are determined based on the records of the troubleshooting in the past, the corporation know-how, etc.

For example, in case of "question code"=4 shown in FIG. 2, the correlation level is determined in the following order.

| cause code | correlation level |
| --- | --- |
| H | 4 |
| A to C | 2 |
| D, I, J | 1 |
| E, F, G | 0 |

The answer weighting table 380 shown in FIG. 5 is a table that defines the correspondence between the answer to "question" discussed above and a weight (answer value). The examples shown in the drawing adopts a method to allow the searcher to choose one out of three alternatives, "YES", "NO", and "UNKNOWN". In case of "YES", the answer value is 1. In case of "NO", the answer value is −1, and in case of "UNKNOWN", the answer value is 0 (zero).

Figures 14, 15:
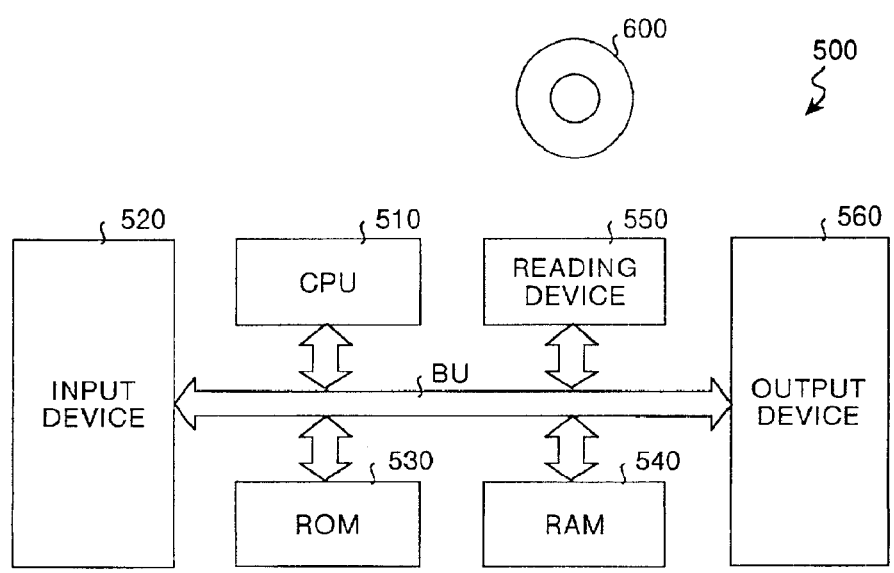
FIG. 14 is a view showing an example of a probable cause display screen 430 in the above embodiment.
FIG. 15 is a block diagram showing a modification of the above embodiment.

The display color table 390 shown in FIG. 6 is a table that defines a relation between "judged value" quantitatively representing the certainty of the probable cause hit by the fuzzy matching and "display color" specifying a color to display such a cause as the search result (see FIG. 14). More specifically, in case that "judged value" is 5 or less, "display color" of the search result is blue. Also, in case that "judged value" is 6 or 7, "display color" of the search result is yellow. Further, in case that "judged value" is 8 or greater, "display color" of the search result is red.

Figure 11:
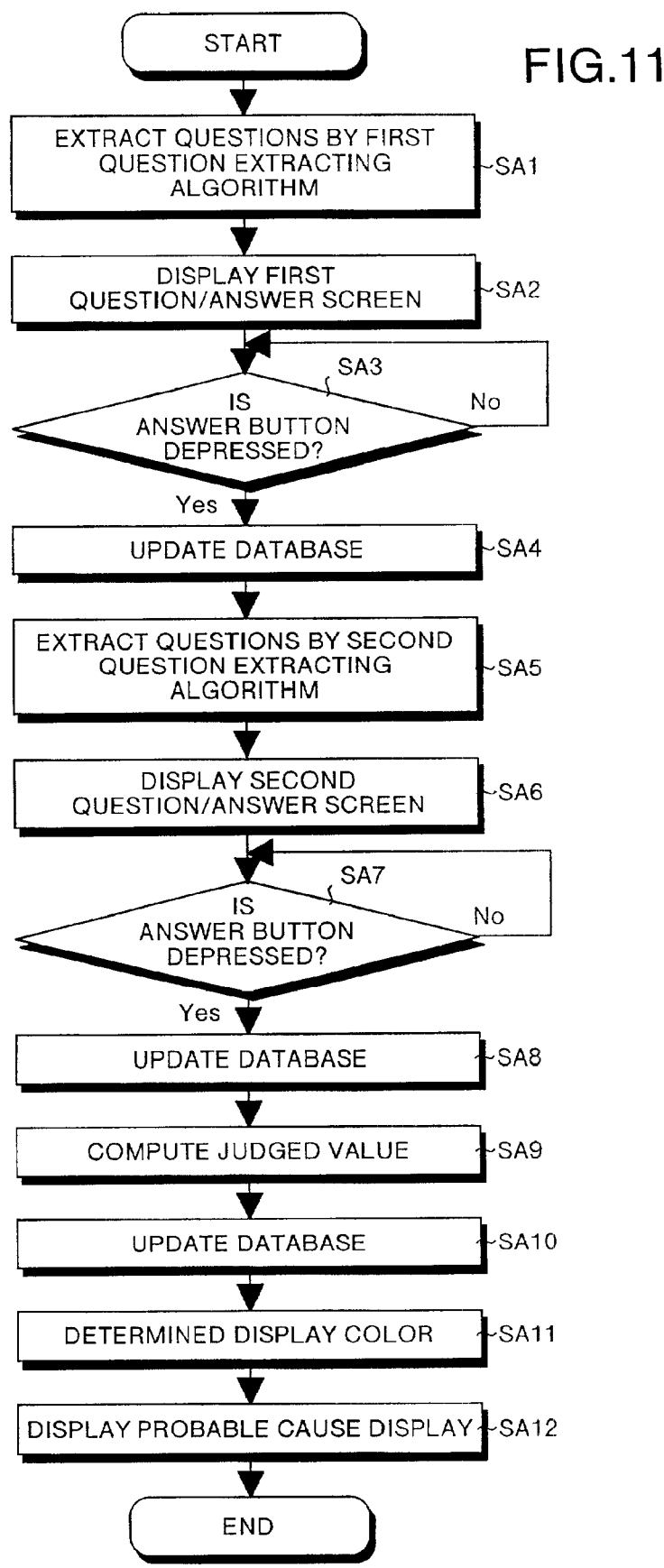
FIG. 11 is a flowchart detailing an operation of the above embodiment.

Next, the following description will describe the aforementioned operation in one embodiment with reference to the flowchart shown in FIG. 11. When the client 100 shown in FIG. 1 gains an access to the information search apparatus 300 through the network 200, in Step SA1 shown in FIG. 11, the search control unit 330 extracts first questions to the searcher out of 10 questions provided for convenience of explanation that respectively correspond to "question codes"=1 through 10 shown in FIG. 7 in accordance with a first question extracting algorithm.

More specifically, according to the first question extracting algorithm, the search control unit 330 compares an absolute value of the correlation level for each "question code" in the information search database 350 with a preset threshold value=1, and extracts "question code" whose absolute value is equal to the threshold value=1 or less. In short, the first question extracting algorithm has an object to extract any question having a remote correlation with the cause. In this case, four questions (see FIG. 3) corresponding to "question codes"=1, 2, 5, and 10 encircled by a bold line in FIG. 7 are extracted for convenience of explanation, which are set forth as follow.

| question code | question |
|---|---|
| 1 | Is deficiency caused at high temperature? |
| 2 | Is deficiency caused at low temperature? |
| 5 | Is deficiency caused at low voltage? |
| 10 | Is there any noise at the power source? |

In Step SA2, the search control unit 330 makes the display device 120 display a first question/answer screen 410 shown in FIG. 12. The first question/answer screen 410 displays the foregoing four questions extracted by the first question extracting algorithm, a plurality of check boxes to allow the searcher to choose one of three alternatives including "YES", "NO", and "UNKNOWN", and an answer button 411. In Step SA3, the search control unit 330 judges whether the answer button 411 is depressed or not, and herein, it judges negative ("NO") and repeats this judgment.

Here, the searcher operates the input device 110 and choose the answer by marking the check boxes for the foregoing four questions. Suppose the searcher has answered as follows.

| question code | question | answer |
|---|---|---|
| 1 | Is deficiency caused at high temperature? | YES |
| 2 | Is deficiency caused at low temperature? | YES |

-continued

| question code | question | answer |
|---|---|---|
| 5 | Is deficiency caused at low voltage? | NO |
| 10 | Is there any noise at the power source? | UNKNOWN |

Then, when the searcher depresses the answer button 411, the search control unit 330 judges "YES" in Step SA3. In Step SA4, the search control unit 330 updates the information database 350 as shown in FIG. 7.

More specifically, the search control unit 330 finds the answer values (weights) to the above answers as follows with reference to the answer weighting table 380 shown in FIG. 5.

| question code | question | answer | answer value |
|---|---|---|---|
| 1 | Is deficiency caused at high temperature? | YES | 1 |
| 2 | Is deficiency caused at low temperature? | YES | 1 |
| 5 | Is deficiency caused at low voltage? | NO | −1 |
| 10 | Is there any noise at the power source? | UNKNOWN | 0 |

Then, the search control unit 330 fills these answer values into the cells respectively corresponding to "question codes"=1, 2, 5, and 10 in the record of the first answer value shown in FIG. 7. Consequently, the information search database 350 is updated. In Step SA5, the search control unit 330 extracts second questions to the searcher out of questions that were not extracted in Step SA1 in accordance with a second question extracting algorithm.

More specifically, according to the second question extracting algorithm, the search control unit 330 extracts those having a positive first answer value shown in FIG. 8. In this case, the first answer value (=1) corresponding to both "question codes"=1 and 2 is extracted. Then, the search control unit 330 compares the correlation level with the first answer value for each cause code in the lateral direction, and judges whether the extracting condition that all the correlation levels are positive is satisfied or not.

More specifically, "cause code"=A has the correlation level=1 for "question code"=1, and the correlation level=0 for "question code"=2, and therefore, is not extracted. The following "cause code"=B has the correlation level=1 for "question code"=1, and the correlation level=1 for "question code"=2, and therefore, is extracted. Thereafter, the search control unit 330 judges whether the extracting condition is satisfied or not for each of "cause codes"=C through J.

In the example shown in the drawing, four causes corresponding to "cause codes"=B, D, F, and G encircled by a bold line in a lateral direction are extracted for convenience of explanation. Then, the search control unit 330 extracts questions that were not asked in Step SA2 out of 10 questions provided for convenience of explanation and respectively corresponding to "question codes" 1 through 10. In this case, 6 questions respectively corresponding to "question codes"=3, 4, 6 through 9 are selected for convenience of explanation.

Then, the search control unit 330 extracts questions corresponding to "cause codes"=B, D, F, and G, and whose absolute values of the correlation levels in the longitudinal direction corresponding to "question codes"=3, 4, 6 through 9 are not straight 0's. In the example shown in the drawing, a question corresponding to "question code"=3 is not extracted because the absolute values of the correlation levels corresponding to "cause codes"=B, D, F, and G are all 0's.

On the other hand, questions corresponding to "question codes" 4 and 6 through 9 are extracted. In this case, five questions (see FIG. 3) respectively corresponding to "question codes"=4 and 6 through 9 shown in FIG. 8 are extracted for convenience of explanation, which are set forth as follows.

| question code | question |
| --- | --- |
| 4 | Is deficiency caused at high voltage? |
| 6 | Is deficiency caused at standard voltage? |
| 7 | Is intermittent failure occurring? |
| 8 | Is a clock signal distorted? |
| 9 | Is there any noise in output data? |

In Step SA6, the search control unit 330 makes the display device 120 display a second question/answer screen 420 shown in FIG. 13. Like the first question/answer screen 410 (see FIG. 12), the second question/answer screen 420 displays the foregoing five questions extracted by the second question extracting algorithms, a plurality of check boxes to allow the searcher to choose one of three alternatives including "YES", "NO", and "UNKNOWN", and an answer button 421. In Step SA7, the search control unit 330 judges whether the answer button 421 is depressed or not, and herein, it judges negative ("NO"), and repeats this judgment.

Here, the searcher operates the input device 110 and choose the answers for the foregoing five questions by using the check boxes. Suppose the searcher has answered as follows.

| question code | question | answer |
| --- | --- | --- |
| 4 | Is deficiency caused at high voltage? | UNKNOWN |
| 6 | Is deficiency caused at standard voltage? | YES |
| 7 | Is intermittent failure occurring? | NO |
| 8 | Is a clock signal distorted? | YES |
| 9 | Is there any noise in output data? | YES |

Then, when the searcher depresses the answer button 421, the search control unit 330 judges "YES" in Step SA7. In step SA8, the search control unit 330 updates the information database 350 as shown in FIG. 10.

More specifically, the search control unit 330 finds the answer values (weights) to the above answers as follows with reference to the answer weighting table 380 shown in FIG. 5.

| question code | question | answer | answer value |
| --- | --- | --- | --- |
| 4 | Is deficiency caused at high voltage? | UNKNOWN | 0 |
| 6 | Is deficiency caused at standard voltage? | YES | 1 |
| 7 | Is intermittent failure occurring? | NO | −1 |
| 8 | Is a clock signal distorted? | YES | 1 |
| 9 | Is there any noise in output data? | YES | 1 |

Then, the search control unit 330 fills these answer values into the cells respectively corresponding to "question codes"=4 and 6 through 10 in the record of the second answer value shown in FIG. 10. Consequently, the information search database 350 is updated. In Step SA9, the search control unit 330 computes a judged value that represents quantitatively the certainty of each of the causes corresponding to "cause codes"=B, D, F, and G (see FIG. 10, encircled by a bold line in the lateral direction), respectively and extracted by the second question extracting algorithm.

More specifically, the search control unit 330 uses a sum of multiplications of the correlation levels in the lateral direction of "cause code"=B shown in FIG. 10 and the corresponding first or second answer value as the judged value. In the example shown in the drawing, the judged value of the cause corresponding to "cause code"=B is 4. Likewise, the judged values of the causes corresponding to "cause codes"=D, F, and G are 10, 9, and 7, respectively. In Step SA10, the search control unit 330 fills the foregoing judged values=4, 10, 9, and 7 into the fields of the judged value as shown in FIG. 10, whereby the information search database 350 is updated.

In Step SA11, the search control unit 330 determines the display color of each cause with reference to the display color table 390 shown in FIG. 6 and each judged value shown in FIG. 10. In this case, the relation between the causes, judged values, and display colors are as follows.

| cause | judged value | display color |
| --- | --- | --- |
| D | 10 | red |
| F | 9 | red |
| G | 7 | yellow |
| B | 4 | blue |

In Step SA12, the search control unit 330 makes the display device 120 display a probable cause display screen 430 as shown in FIG. 14 based on the determination result in Step SA11. The probable cause display screen 430 displays the probable causes as the result ("cause code", "cause", and "judged value") of the fuzzy matching in decreasing order of the judged vales. Here, the display color of each cause is displayed in accordance with the determination result in Step SA11. Consequently, the searcher can know the certainty of the four causes given for convenience of explanation by the display colors (judged values) and can assign priorities when taking corresponding actions.

As has been discussed, according to one embodiment, from the information search database 350 as the knowledge database storing the causes, questions, and correlation levels, certain questions are extracted out of a plurality of questions by the first and second algorithms based on the correlation levels, and the causes with the high correlation levels are extracted out of a plurality of causes based on the searcher's answers to the certain questions. Consequently, it is possible to enhance the matching accuracy of the fuzzy matching using the knowledge database.

According to one embodiment, because the judged value (priority) based on the correlation level is found for each of the extracted causes, the importance of the causes as the search result can be presented to the searcher in a clear manner.

Also, according to one embodiment, the causes are displayed in colors corresponding to the judged values (priorities) as shown in FIG. 14. This allows the searcher to judge at a glance the importance of the causes as the search result.

One embodiment of the present invention has been described with reference to the drawings. However, concrete examples are not limited to the above embodiment, and any modification and change within the scope of the present invention are included in the invention.

For example, in the above embodiment, an information search program for achieving the function of the information search apparatus 300 discussed above may be recorded in a computer readable recording medium 600 shown in FIG. 15, so that the information search is conducted by making a computer 500 shown in the drawing read and run the information search program recorded in the recording medium 600.

The computer 500 shown in FIG. 15 is composed of a CPU 510 for running the information search program, an input device 520, such as a keyboard and a mouse, a ROM (Read Only Memory) 530 for storing various data, a RAM (Random Access Memory) 540 for storing computation parameters or the like, a reading device 550 for reading the information search program from the recording medium 600, an output device 560, such as a display and a printer, and a bus BU for interconnecting these members.

The CPU (Central Processing Unit) 510 reads the information search program recorded in the recording medium 600 by means of the reading device 550, and then runs the program, thereby conducting a series of jobs related to the fuzzy matching discussed above. The recording medium 600 includes portable recording media, such as an optical disk, a floppy disk, and a hard disk, and also includes a transmission medium for recording and holding the data temporarily, such as a network.

In addition, as shown in FIG. 1, the above embodiment explained an arrangement such that the client 100 accesses the information search device 300 through the network 200. However, the present invention is not limited to this arrangement, and any arrangement is applicable as long as the environment capable of conducting the fuzzy matching is provided. For example, as another example arrangement, the client 100 may be connected to the information search apparatus 300 directly via a cable, the client 100 and information search apparatus 300 maybe achieved in a single apparatus, etc.

As has been discussed, according to the present invention, from the knowledge database storing the causes, questions, and correlation levels, certain questions are extracted out of a plurality of questions by the first and second algorithms based on the correlation levels, and the causes with the high correlation levels are extracted out of a plurality of causes based on the searcher's answers to the certain questions. Consequently, there can be offered an effect that the matching accuracy of the fuzzy matching using the knowledge database can be enhanced.

Furthermore, because the priority based on the correlation level is assigned to each of the causes extracted in a cause extracting step, there can be offered an effect that the importance of the causes as the search result can be presented to the searcher in a clear manner.

In addition, the causes extracted in the cause extracting step as the search result are displayed in colors corresponding to the priorities. This can offer an effect that the searcher is allowed to judge at a glance the importance of the causes as the search result.

Moreover, a weight is assigned to each answer result in the cause extracting step, and therefore, the causes can be extracted in accordance with the answer result. Hence, there can be offered an effect that the matching accuracy in the fuzzy matching using the knowledge database can be further enhanced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable storage controlling a computer to search information and comprising a process of:

storing, in a knowledge database, a plurality of causes for a problem to be diagnosed, a plurality of questions having relations with the plurality of causes, correlation levels showing a degree of correlation between the causes and each of the plurality of questions, and predetermined answer choices to the plurality of questions;

extracting certain questions from the plurality of questions using an algorithm that compares the correlation levels between the causes and the plurality of questions to a predetermined threshold value to determine the relevancy of the plurality of questions to the problem to be diagnosed;

displaying the certain questions to a user;

for each of the certain questions displayed to the user, receiving an answer selected by the user from the predetermined answer choices;

extracting causes with high correlation levels from the plurality of causes based on the user selected answers to the certain questions displayed to the user and the correlation levels; and displaying the extracted causes to the user.

2. The computer-readable storage according to claim 1, further comprising assigning a priority to each of the extracted causes based on the correlation levels.

3. The computer-readable storage according to claim 2, further comprising displaying, as a search result, the extracted causes in colors, each color corresponding to one of the priorities.

4. The compute-readable storage according to claim 1, wherein said extracting causes comprises assigning a weight to each of the answers.

5. A method of searching information using an information search apparatus connected to a client via a network, the client being connected to an input device and a display, the method comprising:

storing, in a knowledge database of the information search apparatus, a plurality of causes for a problem to be diagnosed, a plurality of questions having relations with the plurality of causes, correlation levels showing a degree of correlation between the causes and each of the plurality of questions, and predetermined answer choices to the plurality of questions:

extracting certain questions from the plurality of questions using an algorithm that compares the correlation levels between the causes and the plurality of questions to a predetermined threshold value to determine the relevancy of the plurality of questions to the problem to be diagnosed;

displaying, on the display, the certain questions to be answered by a user;

for each of the certain questions displayed to the user, receiving an answer selected by the user from the predetermined answer choices, via the network, the answers being input by the user using the input device;

extracting causes with high correlation levels from the plurality of causes based on the user selected answers to the certain questions displayed to the user and the correlation levels; and displaying the extracted causes to the user.

6. The method of searching information according to claim 5, further comprising assigning a priority to each of the extracted causes based on the correlation levels.

7. The method of searching information according to claim 6, further comprising displaying, on the display as a search result, the extracted causes in colors, each color corresponding to one of the priorities.

8. The method of searching information according to claim 5, wherein said extracting causes comprises assigning a weight to each of the answers.

9. A system for searching information having an information search apparatus connected to a client via a client network, the client being connected to an input device and a display, the information search apparatus comprising:

a knowledge database storing a plurality of causes for a problem to be diagnosed, a plurality of questions having relations with the plurality of causes, correlation levels showing a degree of correlation between the causes and each of the plurality of questions, and predetermined answer choices to the plurality of questions;

a first control unit extracting certain questions from the plurality of questions using an algorithm that compares the correlation levels between the causes and the plurality of questions to a predetermined threshold value to determine the relevancy of the plurality of questions to the problem to be diagnosed, displaying the certain questions to be answered by a user of the display, and for each of the certain questions displayed to the user, receiving an answer selected by the user from the predetermined answer choices via the network, the answers being input by the user using the input device; and a second control unit extracting causes with high correlation levels from the plurality of causes based on the user selected answers to the certain questions displayed to the user and the correlation levels; and displaying the extracted causes to the user.

10. The system according to claim 9, wherein the second control unit assigns a priority to each of the extracted causes based on the correlation levels.

11. The system according to claim 10, wherein the second control unit displays, on the display as a search result, the extracted causes in colors, each color corresponding to one of the priorities.

12. The method of searching information according to claim 9, wherein the second control unit assigns a weight to each of the answers.

13. A computer-readable storage controlling a computer to search information and comprising a process of:

storing, in a knowledge database, a plurality of causes for a problem, a plurality of questions having relations with the plurality of causes, correlation levels showing a degree of correlation between the causes and each of the plurality of questions; and predetermined answer choices to the plurality of questions;

extracting a first set of certain questions having a remote correlation with the problem from the plurality of questions using a first question extracting algorithm that compares the correlation levels between the plurality of causes and the plurality of questions to a predetermined threshold value to determine the relevancy of the plurality of questions to the problem to be diagnosed;

displaying the first set of certain questions of the user;

for each of the first set of certain questions displayed to the user, receiving an answer selected by the user from the predetermined answer choices;

extracting a second set of certain questions from the remaining questions having a correlation with the problem from the plurality of questions using a second question extracting algorithm using correlation levels and the answers received from the user;

displaying the second set of certain questions to the user;

for each of the second set of certain questions displayed to the user, receiving an answer selected by the user from the predetermined answer choices;

weighting the causes using the answers provided by the user and the correlation levels; and displaying the weighted causes to the user to indicate relevance to the problem.

* * * * *

UNITED STATES PATENT AND TRADEMARK OFFICE
CERTIFICATE OF CORRECTION

PATENT NO. : 6,868,409 B2
DATED : March 15, 2005
INVENTOR(S) : Noriyuki Matsui et al.

It is certified that error appears in the above-identified patent and that said Letters Patent is hereby corrected as shown below:

Column 10,
Line 59, change "compute-readable" to -- computer-readible --.

Column 11,
Line 5, replace ":" with -- ; --.

Column 12,
Line 34, change "questions of" to -- questions to --.

Signed and Sealed this

Thirteenth Day of September, 2005

JON W. DUDAS
*Director of the United States Patent and Trademark Office*